United States Patent [19]

Abusleme et al.

[11] Patent Number: 5,902,860
[45] Date of Patent: May 11, 1999

[54] BLENDS OF FLUORINATED AND ACRYLIC ELASTOMERS

[75] Inventors: Julio A. Abusleme, Saronno; Anna Staccione, Milan; Vincenzo Arcella, Novara, all of Italy

[73] Assignees: Ausimont S.p.A., Milan, Italy; Nippon Zeon Co., Ltd., Tokyo, Japan

[21] Appl. No.: 09/021,532

[22] Filed: Feb. 10, 1998

[30] Foreign Application Priority Data

Feb. 11, 1997 [IT] Italy ................... MI97A0269

[51] Int. Cl.$^6$ ...................... C08F 8/00
[52] U.S. Cl. ...................... 525/326.3
[58] Field of Search ...................... 525/326.3

[56] References Cited

U.S. PATENT DOCUMENTS

| | | |
|---|---|---|
| 4,035,565 | 7/1977 | Apotheker . |
| 4,243,770 | 1/1981 | Tatemoto et al. . |
| 4,251,399 | 2/1981 | Tomoda et al. . |
| 4,745,165 | 5/1988 | Arcella et al. . |
| 5,153,272 | 10/1992 | Chiodini et al. . |
| 5,173,553 | 12/1992 | Albano et al. . |
| 5,412,034 | 5/1995 | Tabb . |

FOREIGN PATENT DOCUMENTS

| | | |
|---|---|---|
| 199138 | 10/1986 | European Pat. Off. . |
| 0304 843 | 3/1989 | European Pat. Off. . |
| 0304843 | 3/1989 | European Pat. Off. . |
| 373973 | 6/1990 | European Pat. Off. . |
| 518073 | 12/1992 | European Pat. Off. . |
| 525685 | 2/1993 | European Pat. Off. . |
| 525687 | 2/1993 | European Pat. Off. . |
| 0592691 | 4/1994 | European Pat. Off. . |
| 0598132 | 5/1994 | European Pat. Off. . |

*Primary Examiner*—Edward J. Cain
*Attorney, Agent, or Firm*—Stevens, Davis, Miller & Mosher, L.L.P.

[57] ABSTRACT

Compounds comprising a peroxide and a peroxide curable blend essentially consisting of hydrocarbon elastomers containing at least an acrylic monomer and of fluorinated VDF-based elastomers having in the polymer chain at least 5% by moles of hydrogenated groups $C_1$ of the type

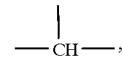

—$CH_2$— and/or —$CH_3$, the amount of fluorinated rubber in the elastomeric blend being comprised from 5 to 75% by weight, said elastomers of the blend not containing iodine and/or bromine.

14 Claims, No Drawings

BLENDS OF FLUORINATED AND ACRYLIC ELASTOMERS

FIELD OF THE INVENTION

The present invention relates to new elastomers obtained from blends of fluorinated rubber and hydrocarbon rubber wherein as fluorinated rubber is meant a rubber based on vinylidene fluoride (VDF) and as hydrocarbon rubber is meant a hydrocarbon elastomer having at least one acrylic monomer as base monomer.

BACKGROUND OF THE INVENTION

The fluorinated elastomers (FKM) perfomance, intended as the set of mechanical properties, compression set, thermal and chemical resistance, are notably higher than those of hydrocarbon rubbers. Such high performances of fluorinated elastomers involve however rather high costs making their use very restricted. This is due to the higher cost of the monomers and to the process technology used in their preparation.

As a consequence the users of elastomers are obliged to choose between two elastomeric families which are completely different in terms of performances and costs: fluorinated elastomers and hydrocarbon elastomers.

There was the need to have available elastomers showing superior properties in terms of thermal and chemical resistance compared with hydrocarbon elastomers used at present.

The U.S. Pat. No. 4,251,399 describes a blend formed by an iodine-containing fluoroelastomer and a hydrogenatd elastomer, said blend is crosslinked by peroxidic way. Besides, it is pointed out that the fluoroelastomers to be used must contain a peroxidic cure-site, for example iodine.

It is also known in the art, see for example U.S. Pat. No. 5,412,034, a co-curable blend formed by a fluoroelastomer and a hydrocarbon elastomer showing good properties after curing. In said patent the blend is crosslinked by peroxidic way in the case the fluoroelastomer contains a cure-site, particularly bromine. If the fluoroelastomer does not contain a cure-site, such as bromine or iodine, then an ionic crosslinking system is used, for example amines or bisphenol in combination with quaternary phosphonium salts.

According to U.S. Pat. No. 4,251,399 and U.S. Pat. No. 5,412,034, the crosslinking through peroxidic way of the blends of hydrocarbon and fluorinated elastomers is characterized by the presence of iodine and/or bromine cure-sites in the fluoroelastomer.

Said fluoroelastomers, well known in the art, can be prepared in the presence of cure-site monomers containing iodine and/or bromine, as described in U.S. Pat. No. 4,035,565, U.S. Pat. No. 4,745,165 and EP 199,138 Patents, and/or in the presence of chain transfer agents containing iodine and/or bromine, where said transfer agents give rise to iodinated and/or brominated endgroups, as described in U.S. Pat. No. 4,243,770 and U.S. Pat. No. 5,173,553.

Said iodine and/or bromine containing fluoroelastomers during the vulcanization, in the presence of an organic peroxide, have the disadvantage to develop toxic substances such as methyl and ethyl iodide and bromide. Methyl iodide and bromide are particularly harmful.

In order to solve such drawbacks, in EP 373,973 substances capable to prevent, or at least to substantially reduce methyl and ethyl iodide and bromide emissions are described.

To this purpose in U.S. Pat. No. 5,153,272 specific peroxides, such as bis-(1,1-dimethylpropyl) peroxide, are described as capable of reducing the above emissions.

SUMMARY OF THE INVENTION

The Applicants have now surprisingly and unexpectedly found that it is possible to obtain new elastomers, curable by peroxidic way, formed by a blend of fluoroelastomers and hydrocarbon elastomers said blend non containing iodine and/or bromine. These new elastomers, after vulcanization, show improved chemical and thermal resistance with respect to hydrocarbon elastomers.

It is, thus, an object of the present invention a compound comprising a peroxide and a curable blend consisting essentially of hydrocarbon elastomers containing at least an acrylic monomer and of fluorinated elastomers based on VDF, said fluorinated elastomers having in the polymer chain at least 5 by moles of hydrogenated groups $C_1$ of the type

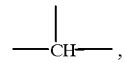

$—CH_2—$ and/or $—CH_3$, the amount of fluorinated elastomer in the elastomeric blend being comprised from 5 to 75% by weight, preferably from 15 to 50% by weight, said elastomers of the blend not containing iodine and/or bromine.

DETAILED DESCRIPTION OF THE PREFERRED EMBODIMENTS

The mixing of the hydrocarbon rubber and of the fluorinated rubber can be carried on in a closed mixer (Banbury) or in an open mixer. In alternative it is possible to co-coagulate said rubbers starting from their respective latexes obtained through the conventional polymerization techniques in emulsion and/or microemulsion.

The cured rubber obtainable from the curable blend of the present invention shows a set of characteristics which are superior than those of the hydrocarbon rubbers, particularly as regards the thermal and chemical resistance.

The compound comprising the blend of the hydrocarbon and fluorinated rubbers and the peroxides for the crosslinking, can optionally contain other components referred to 100 phr of the elastomer blend such as: coagents for the peroxidic crosslinking; metal oxides, (e.g., PbO, ZnO, MgO), generally in amounts from 0 to 10 phr; fillers, e.g. carbon black, silica, clay or talc, generally in amounts from 5 to 80 phr; suitable processing aids such as, for example, fatty acids or their alkyl esters or their salts or their amides or their mixtures, as stearic acid, alkaline metals stearates such as sodium and potassium, alkyl stearates; as stabilizers, for example antioxidants such as substituted diphenylamines (for example Naugard® 445).

As suitable commercial processing aids it can be used any of those known for the processing of hydrogenated and/or fluorinated rubbers. It can be mentioned as example Gleak®

G 8205, Carnauba Wax® and Armid-O® which is the preferred. The cited formulation is carried on in a closed or open mixer.

The fluoroelastomers of the invention are based on vinylidene fluoride (VDF), as for example the copolymers of hexafluoro-propene (HFP), and optionally of tetrafluoroethylene (TFE).

Other monomers, fluorinated and not, can be present. For example chlorotrifluoroethylene (CTFE), ethylene (E) and perfluoroalkylvinylethers with the alkyl from 1 to 4 carbon atoms, for example perfluoromethylvinylether (MVE) and perfluoropropylvinylether (PVE).

Among the fluoroelastomers having the cited monomers can be mentioned, for example: TFE/VDF/MVE; VDF/HFP/E; E/TFE/MVE. Said fluoroelastomers are well known in the art, see, for example EP 525,685, EP 525,687 and EP 518,073, herein incorporated by reference.

As already said, the fluorinated elastomers of the present invention are characterized by having at least 5% by moles of hydrogenated groups $C_1$ (having 1 carbon atom), preferably at least 15% by moles. More preferred are the fluorinated elastomers such as VDF/HFP and VDF/HFP/TFE containing hydrogenated groups $C_1$ in amounts of at least 30% by moles. Said hydrocarbon groups can be determined for example by NMR analysis.

The hydrocarbon elastomers of the present invention are (co)polymers containing at least one acrylic monomer.

The acrylic monomer content in the hydrocarbon elastomer is generally comprised from 20 to 100% by moles, preferably from 40 to 100% and more preferably from 90 to 100%. The difference to 100 can be done, for example by: hydrocarbon monomers such as, for example, hydrogenated alpha olefins such as ethylene and propylene; hydrocarbon dienic monomers such as butadiene; vinyl esters of the carboxylic acid $C_2$–$C_8$ such as vinyl acetate, vinyl propionate, vinyl 2-ethylhexanoate; olefins with other functional groups (for example allylglycidylether).

Among the most known acrylic monomers can be cited: alkyl acrylates which include $C_1$–$C_8$ alkyl esters of acrylic and methacrylic acids, among which preferred are methyl acrylate, ethyl acrylate (EA) and butyl acrylate (BA), ethylhexylacrylate; alkoxy-substituted alkyl acrylates wherein the alkoxy-substituted alkyl group has from 2 to 20 carbon atoms, such as for example 2-methoxyethylacrylate, 2-ethoxyethylacrylate, 2-(n-propoxy)propylacrylate and 2-(n-butoxy)ethylacrylate; acrylates and methacrylates containing double bonds, chlorine (for example chloro-ethylacrylate) or other functional groups (for example glycidylmethacrylate).

As representative examples of said hydrocarbon elastomers, the following polymers can be cited: polyethylacrylate, polybutylacrylate, polyethylbutylacrylate, polyethylbutyl acrylate glycidylmethacrylate, poly-ethylene-methylacrylate, poly-ethylene-methylmethacrylate, poly-ethylene-butylacrylate, etc.

Peroxides used in the crosslinking of the present invention can be aliphatic or cyclo-aliphatic, such as for example: 2,5-dimethyl-2,5-di(terbutylperoxy)hexane (LUPERCO® 101 XL), dicumyl peroxide, terbutylperbenzoate, 1,1-di(terbutylperoxy)butyrate.

The amount of peroxide used is comprised between 0.1 to 10 phr (per hundred rubber), preferably from 0.5 to 5 phr. The peroxide, if desired, can also be supported on inert material whose weight is not included in the range of values indicated for the peroxide.

The coagents are used in crosslinking systems with peroxide to improve the curing of the blend. The most preferred are polyunsaturated coagents such as: triallyl cyanurate, triallyl isocyanurate, trimethallyl isocyanurate and N,N'-m-phenylene-dimaleimide. The amount used of said coagents is comprised between 0.1 and 10 phr, preferably between 0.5 and 5 phr. If desired the-coagent can be also supported on inert material.

The inert material is well known in the art and the fillers indicated above can be cited as examples of supports. The compounds of the present invention can be used for the manufacture of O-rings, gaskets, pipes, sleeves and sheets.

The compounds of the present invention are especially useful in the manufacture of items in the automotive field, such as for instance the production of shaft-seals.

The present invention will now be better illustrated by the following working examples, which have a merely illustrative purpose, and are not limitative of the scope of the present invention.

Some characteristics of the elastomers used in the examples of the present invention are reported in Table 1.

The tensile properties have been determined according to the ASTM D 412C method.

The compression set values have been determined on O-rings according to the ASTM D 1414 method.

The Shore A hardness has been determined according to the ASTM D 2240 method. The volume variation has been determined according to the ASTM D471 method.

EXAMPLES 1–11

The hydrogenated rubber (D or E) and the fluoroelastomer (A), (B), or (C) are introduced according to the percentages indicated in Tables 2 and 3 on the rollers of an open mixer (θ=100 mm, L=200 mm) and mixed at the temperature of 25°–40° C. The so obtained elastomeric blend is added with the ingredients indicated in Tables 2 and 3 and processed in the same mixer according to the ASTM D3182 standard. The compound is characterized by analysis on oscillating disk rheometer ODR (ASTM D2084/81). The properties of the cured product are determined on compression molded plaques (130 mm×130 mm×2 mm) at 170° C. for 20 minutes and on O-rings (internal diameter equal to 25.4 mm for 3.55 mm of thickness) compression molded at 170° C. for 15 minutes. The post-treatment is carried out in an air-circulating oven.

EXAMPLE 12

The elastomeric blend formed by 70 g of hydrocarbon rubber (D) and 30 g of fluoroelastomer (A) was obtained by mixing the latexes and subsequent coagulation with aluminium sulphate and drying at 80° C. for about 16 hours. The rubbers blend was then formulated as indicated in Table 3, according to the modalities described in Examples 1–11. The obtained values of the mechanical properties and of compression set are very similar to those obtained with the mechanical mixture of the rubbers (Example 7).

EXAMPLE 13

Comparative 100 g of fluoroelastomer (A) are formulated as indicated in Table 3, according to the modalities described in Examples 1–11. It was not possible to obtain compression molded manufactured articles (O-ring and plaques) due to the poor crosslinking degree.

EXAMPLE 14

Comparative 400 g of hydrogenated rubber (D) are introduced on the rollers of an open mixer (θ=150 mm, L=300 mm), formulated as indicated in Table 4 and processed in the mixer according to the ASTM D 3182 standard. The blend characterization was carried out as indicated in Examples 1–11. The thermal and chemical resistances are reported in Table 5.

EXAMPLE 15

280 g of hydrogenated rubber (D) and 120 g of fluoroelastomer (A) are introduced on the rollers of an open mixer (θ=150 mm; L=300 mm) and mixed at the temperature of 25°–40° C. It was then proceeded as described in Examples 1–11. The thermal and chemical resistances are reported in Table 5.

The combination of properties of chemical resistance, thermal resistance at high temperature, mechanical properties and compression set is clearly superior to those obtained with the comparative Example 14.

EXAMPLE 16

The hydrogenated rubber (F) and the fluoroelastomer (A) are mixed as in example 15.

The rubber (F) has the following characteristics:

ethylacrylate (EA) 65% by mole:butylacrylate (BA) 35% by moles $ML_{(1+10)}$ 121° C.=43

The so obtained elastomeric blend is added with the ingredients indicated in Table 6.

The thermal and chemical resistance data are reported in Table 7.

This compound was paticularly easy to prepare in the open mixer due to the little sticking to the rolls.

TABLE 1

| RUBBER | COMPOSITION (% by moles) | $ML_{(1+10)}$ 121° C. | Hydrogenated $C_1$ groups (% by moles) |
|---|---|---|---|
| A | VDF/HFP | 80/20 | 52 | 36 |
| B | VDF/HFP/TFE | 65/19/16 | 22 | 30 |
| C | VDF/HFP/E | 74/20/6 | 45 | 39 |
| Hydrogenated rubbers: | | | | |
| D | EA/BA | 55/45 | 43 | / |
| E | EA/BA | 75/25 | 45 | / |

TABLE 2

| Examples | | 1 | 2 | 3 | 4 | 5 |
|---|---|---|---|---|---|---|
| Formulation | | | | | | |
| Hydrogenated rubber D | weight % | 70 | 70 | 70 | 70 | — |
| Hydrogenated rubber E | weight % | — | — | — | — | 70 |
| Fluoroelastomer A | weight % | 30 | 30 | 30 | — | 30 |
| Fluoroelastomer C | weight % | — | — | — | 30 | — |
| Luperco ® 101 XL (1) | phr TAIC ® | 3 | 4,5 | 4 | 3 | 3 |
| drymix (2) | phr TAIC ® | 4 | 2,75 | 5 | 4 | 4 |
| ZnO | phr TAIC ® | 4 | 4 | 4 | 4 | 4 |
| Naugard ® 445 | phr TAIC ® | 0,8 | 0,8 | 0,8 | 0,8 | 0,8 |
| Carbon black SRF (N772) | phr TAIC ® | 50 | 50 | 50 | 50 | 50 |
| Gleak ® G 8205 | phr TAIC ® | — | 1 | — | — | — |
| ODR at 177° C., arc 3°, 24 min. | | | | | | |
| ML | lbf*in | 3,3 | 3,5 | 3,8 | 4 | 3,5 |
| MH | lbf*in | 39,8 | 38,2 | 47,2 | 29,7 | 28,9 |
| ts2 | s | 174 | 144 | 144 | 192 | 186 |
| t'50 | s | 342 | 276 | 288 | 366 | 360 |
| t'90 | s | 702 | 546 | 570 | 750 | 732 |
| Vmax | lbf*in/s | 0,08 | 0,13 | 0,15 | 0,07 | 0,07 |
| Mechanical properties after press cure 170° C. × 20' | | | | | | |
| Modulus 100% | MPa | 3,3 | 4,2 | 5,3 | 2,7 | 2,8 |
| Tensile strength | MPa | 6,9 | 8,2 | 8,6 | 6,5 | 6,5 |
| Elongation at break | % | 262 | 215 | 190 | 280 | 310 |

TABLE 2-continued

| Examples | | 1 | 2 | 3 | 4 | 5 |
|---|---|---|---|---|---|---|
| Hardness Shore A | points | 55 | 59 | 64 | 53 | 59 |
| Mechanical properties after post cure 180° C. × 24 h | | | | | | |
| Modulus 100% | MPa | 3,3 | 3,7 | 5,4 | 2,9 | 2,8 |
| Tensile strength | MPa | 6,9 | 7,8 | 8,3 | 6,6 | 6,4 |
| Elongation at break | % | 264 | 257 | 188 | 278 | 309 |
| Hardness Shore A | points | 57 | 60 | 66 | 56 | 62 |
| Compression set | | | | | | |
| O-ring 175°/70 h | % | 45 | 42 | 38 | 44 | 41 |

(1) 2,5-dimethyl-2,5-di(terbutylperoxy)hexane 45% by weight on inert support (marketed by Atochem, Inc.)
(2) Triallylisocianurate 75% by weight in inert support (marketed by Arwick)

TABLE 3

| Examples | | 6 | 7 | 8 | 9 | 10 | 11 | 12 | 13* |
|---|---|---|---|---|---|---|---|---|---|
| Formulation | | | | | | | | | |
| Hydrogenated rubber D | weight % | 70 | 70 | 70 | 50 | 70 | 70 | 70 | / |
| Fluoroelastomer A | weight % | 30 | 30 | 30 | 50 | / | / | 30 | 100 |
| Fluoroelastomer B | weight % | / | / | / | / | 30 | 30 | / | / |
| Luperco ® 101 XL (1) | phr | 4 | 6 | 5 | 4 | 4 | 6 | 6 | 6 |
| TAIC ® drymix (2) | phr | 3 | 4 | 3,5 | 3 | 3 | 4 | 44 | 4 |
| ZnO | phr | 4 | 4 | 4 | 4 | 6 | 4 | 4 | 4 |
| Naugard ® 445 | phr | 0,8 | 0,8 | 0,8 | 0,8 | 0,8 | 0,8 | 0,8 | / |
| Carbon black SRF (N772) | phr | 40 | 50 | / | 40 | 40 | 50 | 50 | 40 |
| Carbon black HAF (N326) | phr | / | / | 30 | / | / | / | / | / |
| ODR at 177° C., arc 30, 24 min. | | | | | | | | | |
| ML | lbf*in | 4,9 | 4,4 | 4,3 | 4,8 | 2,9 | 3,8 | 5,1 | 10,9 |
| MH | lbf*in | 25,3 | 46,9 | 32,9 | 43,3 | 23,9 | 39,6 | 45,3 | 20 |
| ts2 | s | 186 | 132 | 174 | 132 | 16B | 138 | 132 | 108 |
| t'50 | s | 324 | 258 | 312 | 252 | 300 | 258 | 252 | 132 |
| t'90 | s | 642 | 480 | 612 | 480 | 582 | 492 | 492 | 222 |
| Vmax | lbf*in/s | 0,07 | 0,18 | 0,10 | 0,16 | 0,07 | 0,15 | 0,17 | 0,11 |
| Mechanical properties after press cure 170 ° C. × 20' | | | | | | | | | |
| Modulus 100% | MPa | 1,8 | 5,6 | 2,5 | 4,5 | 1,9 | 5,0 | 5,6 | / |
| Tensile strength | MPa | 7,0 | 8,6 | 7,8 | 6,0 | 6,1 | 7,2 | 8,9 | / |
| Elongation at break | % | 347 | 157 | 264 | 225 | 224 | 137 | 170 | / |
| Hardness Shore A | points | 47 | 63 | 55 | 63 | 42 | 57 | 63 | / |
| Compression set | | | | | | | | | |
| O-ring 1750/70h | % | / | 44 | 46 | 52 | / | 43 | / | / |
| Mechanical properties after post cure 180° C. × 24 h | | | | | | | | | |
| Modulus 100% | MPa | 2,0 | 4,9 | 2,3 | / | / | 4,4 | 5,4 | / |
| Tensile strength | MPa | 6,4 | 8,0 | 7,1 | / | / | 6,0 | 8,5 | / |
| Elongation at break | % | 330 | 180 | 304 | / | / | 132 | 197 | / |
| Hardness Shore A | points | 48 | 63 | 55 | / | / | 57 | 64 | / |
| Cornpression set | | | | | | | | | |
| O-ring 175°/70 h | % | 40 | 43 | 44 | / | / | 36 | 44 | / |
| Thermal ageing 175° C. × 70 h | | | | | | | | | |
| Modulus 100% | MPa | 1,9 | / | / | / | / | / | / | / |
| Tensile strength | MPa | 6,0 | / | / | / | / | / | / | / |
| Elongation at break | % | 363 | / | / | / | / | / | / | / |
| Hardness Shore A | points | 50 | / | / | / | / | / | / | / |

*Comparative Example; (1) and (2) see Table 2
*Comparative Example

TABLE 4

| Examples | | 14* | 15 |
|---|---|---|---|
| Formulation | | | |
| Hydrogenated rubber D | weight % | 100 | 70 |
| Fluoroelastomer A | " | / | 30 |
| Luperco ® 101 XL | phr | 6 | 6 |
| TAIC ® drymix | " | 4 | 4 |
| ZnO | " | 4 | 4 |
| Naugard ® 445 | " | 0,8 | 0,8 |
| Carbon black SRF (N 772) | " | 50 | 50 |

TABLE 4-continued

| Examples | | 14* | 15 |
|---|---|---|---|
| ODR at 177° C., arc 3°, 24 min. | | | |
| ML | lbf*in | 4,8 | 5,6 |
| MH | lbf*in | 31,2 | 48,2 |
| ts2 | s | 168 | 150 |
| t'50 | s | 300 | 276 |
| t'90 | s | 588 | 516 |
| Vmax | lbf*in/s | 0,09 | 0,17 |
| Mechanical properties after press cure 170° C. × 20' | | | |
| Modulus 100% | MPa | 2,5 | 5,3 |
| Tensile strength | MPa | 6,4 | 8,8 |
| Elongation at break | % | 170 | 175 |
| Hardness Shore A | points | 41 | 61 |
| Compression set O-ring 175°/70 h | % | 42 | 49 |
| Mechanical properties after post cure 180° C. × 24 h | | | |
| Modulus 100% | MPa | 2,3 | 5,2 |
| Tensile strength | MPa | 5,9 | 8,6 |
| Elongation at break | % | 183 | 216 |
| Hardness Shore A | points | 38 | 62 |
| Compression set O-ring 175°/70 h | % | 30 | 42 |

*Comparative example

TABLE 5

Thermal and chemical resistance data for the examples 14*
and 15 post-cured at 180° C. × 24 h.

| Examples | | 14* | 15 |
|---|---|---|---|
| Thermal ageing 210° C. × 38 h | | | |
| Modulus 100% change | % | / | / |
| Tensile strength change | % | −53 | −2 |
| Elongation at break change | % | −49 | −48 |
| Hardness Shore A change | points | +6 | +9 |
| Weight change | % | −2,6 | −2,2 |
| ASTM #3 150° C./70 h | | | |
| Modulus 100% change | % | +16 | −4 |
| Tensile strength change | % | −40 | −22 |
| Elongation at break change | % | −36 | −38 |
| Hardness Shore A change | points | −4 | −6 |
| Volume change | % | +32 | +22 |
| Fuel C 23° C./70 h | | | |
| Modulus 100% change | % | / | / |
| Tensile strength change | % | −87 | −83 |
| Elongation at break change | % | −88 | −87 |
| Hardness Shore A change | points | −24 | −15 |
| Volume change | % | +181 | +125 |

*Comparative example

TABLE 6

| Example | | 16 |
|---|---|---|
| Formulation | | |
| Hydrogenated rubber F | weight % | 70 |
| Fluoroelastomer A | " | 30 |
| Luperco ® 101 XL (1) | phr | 5 |
| TAIC ® drymix (2) | " | 5 |
| ZnO | " | 4 |
| Naugard ® 445 | " | 0.8 |
| Carbon black SRF (N772) | " | 50 |
| Armid-O ® | " | 1 |

TABLE 6-continued

| Example | | 16 |
|---|---|---|
| ODR at 177° C., arc 3°, 24 min. | | |
| ML | lbf*in | 3.1 |
| MH | " | 47 |
| ts2 | s | 138 |
| t'50 | " | 276 |
| t'90 | " | 558 |
| Vmax | lbf*in/s | 0.17 |
| Mechanical properties after post cure 180° C. × 8 h | | |
| Modulus 100% | MPa | 5.3 |
| Tensile strength | " | 8.8 |
| Elongation at break | % | 229 |
| Hardness Shore A | points | 68 |
| Compression set O-ring 175°/70 h | % | 46 |

(1) and (2) see Table 2

TABLE 7

Thermal and chemical resistance data for the example 16
post-cured at 180° C. × 8 h.

| Examples | | 16 |
|---|---|---|
| Thermal ageing 200° C. × 70 h | | |
| Modulus 100% change | % | / |
| Tensile strength change | % | +10 |
| Elongation at break change | % | −61 |
| Hardness Shore A change | points | +11 |
| Weight change | % | −2.4 |
| ASTM #3 150° C./70 h | | |
| Modulus 100% change | % | / |
| Tensile strength change | % | −15 |
| Elongation at break change | % | −34 |
| Hardness Shore A change | points | +8 |
| Volume change | % | +19 |

We claim:

1. Compounds comprising a peroxide and a curable blend by peroxidic way, essentially consisting of hydrocarbon elastomers containing at least an acrylic monomer and of fluorinated VDF-based elastomers having in the polymer chain at least 5% by moles of hydrogenated $C_1$ groups of the type

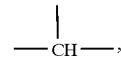

$—CH_2—$ and/or $—CH_3$, the amount of VDF-based elastomers in the elastomeric blend being comprised between 5 and 75% by weight, the elastomers of the blend not containing iodine and/or bromine.

2. Compounds according to claim 1, wherein the amount of VDF-based elastomers is comprised between 15 and 50% by weight.

3. Compounds according to claim 1, wherein the VDF-based elastomers have in the polymer chain at least 15% by moles of hydrogenated $C_1$ groups.

4. Compounds according to claim 3, wherein the fluorinated elastomers have in the polymer at least 30% by moles of hydrogenated $C_1$ groups.

5. Compounds according to claim 1, wherein the acrylic monomer content in the hydrogenated elastomer is between 20 and 100% by moles.

6. Compounds according to claim 5, wherein the acrylic monomer content in the hydrogenated elastomer is between 40 and 100% by moles.

7. Compounds according to claim 6, wherein the acrylic monomer content in the hydrogenated elastomer is between 90 and 100% by moles.

8. Compounds according to claim 1, wherein the VDF-based elastomers are selected among the VDF/HFP copolymers, optionally in the presence of TFE.

9. Compounds according to claim 8, further comprising at least one monomer selected from the group consisting of chlorotrifluoroethylene, ethylene, and perfluoroalkylvinylethers with the alkyl from 1 to 4 carbon atoms.

10. Compounds according to claim 1, wherein in the crosslinking the amount of peroxide used is comprised between 0.1 and 10 phr.

11. Compounds according to claim 10, wherein the amount of peroxide used is comprised between 0.5 and 5 phr.

12. Compounds according to claim 1, further comprising coagents for the peroxidic crosslinking; metal oxides; carbon black fillers; silica, clay or talc; processing aids; stabilizers.

13. Compounds according to claim 1, wherein both elastomers used in the blend derive from coagulation of the rubbers themselves starting from the respective polymerization latexes.

14. Cured products obtained from the compounds according to claim 1.

* * * * *